(No Model.)  2 Sheets—Sheet 1.
J. A. ASHLEY.
COFFEE POT.
No. 292,089. Patented Jan. 15, 1884.
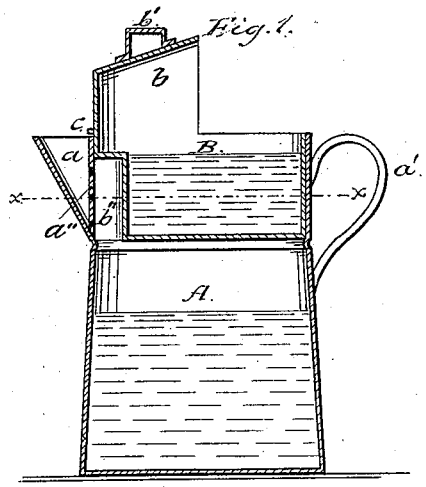
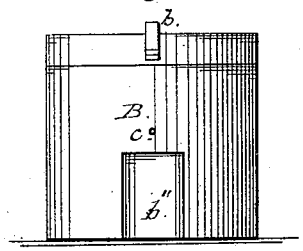
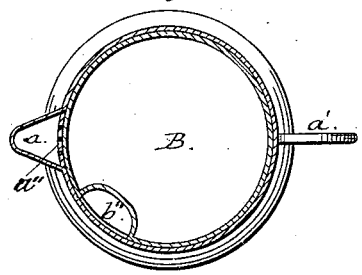
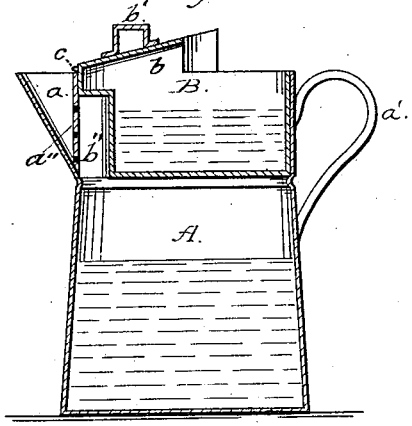
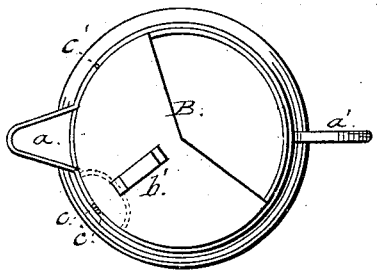
Attest:
F. W. Howard
F. J. Chapman
Inventor;
J. A. Ashley

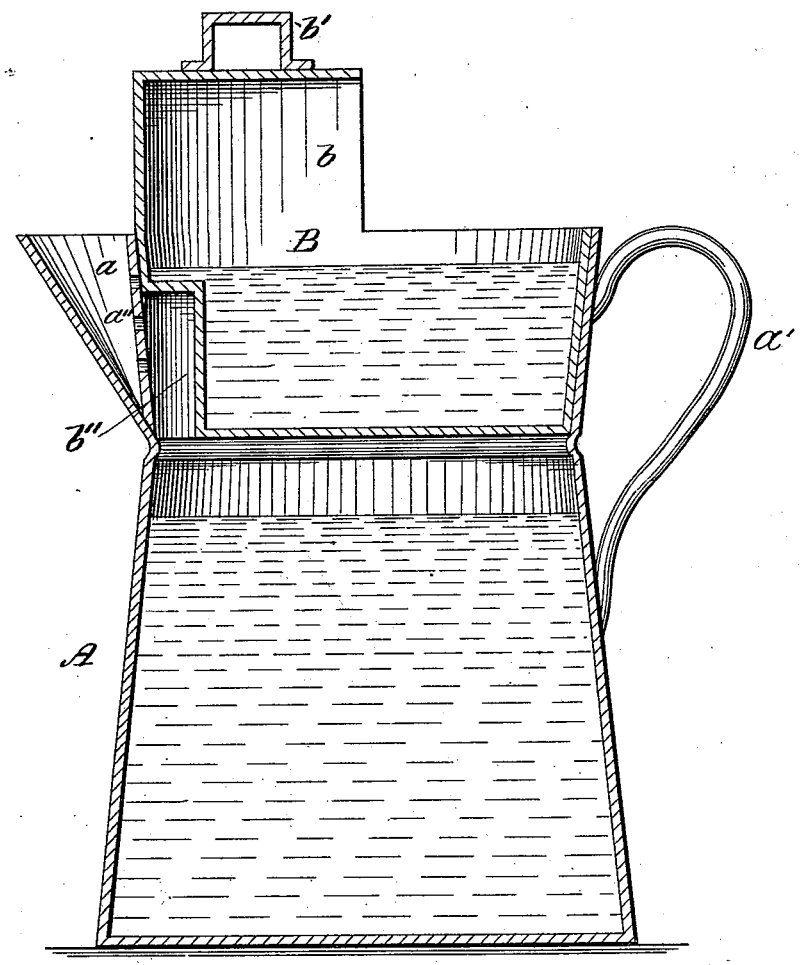

UNITED STATES PATENT OFFICE.

JAMES A. ASHLEY, OF WASHINGTON, DISTRICT OF COLUMBIA.

COFFEE-POT.

SPECIFICATION forming part of Letters Patent No. 292,089, dated January 15, 1884.

Application filed July 14, 1883. (No model.)

*To all whom it may concern:*

Be it known that I, JAMES A. ASHLEY, a citizen of the United States, and a resident of Washington, in the District of Columbia, have invented certain new and useful Improvements in Coffee-Pots, of which the following is a specification.

The improvements relate particularly to that class of coffee-pots in which a covering-vessel is applied at the top of the pot proper, such covering-vessel being adapted to contain a quantity of cold water for the purpose of condensing and utilizing such portions of the decoction as have been made volatile by the application of heat to the lower portion of the coffee-pot.

The object of the invention is the production of a coffee-pot from which the contents may be poured without first removing the condensing-vessel, in which the condensing-vessel shall be open at its top to such an extent as to prevent the water therein from becoming heated to so great a degree as to deprive it of its condensing-power, in which the condensing-vessel shall be so far closed as to prevent the escape of any portion of its contents when the contents of the coffee-pot are being poured out, and in which, by a slight horizontal movement of the condensing-vessel, the pouring-opening of the coffee-pot may be either opened or closed.

In the accompanying sheet of drawings, in which like letters designate like parts in all the figures, Figure 1 is a vertical central section of a coffee-pot and condenser embodying the improvements above referred to. Fig. 2 is a front elevation of the condensing-vessel. Fig. 3 is a horizontal section on the line $x\ x$ of Fig. 1, showing the relation of the parts when the condensing-vessel is turned to one side to cut off communication with the spout. Fig. 4 is a vertical central section, showing a modification in the form of the condensing-vessel. Fig. 5 is a plan of the same, representing the condensing-vessel in position to close the outlets to the pouring-nozzle, as in Fig. 3. Fig. 6 is a vertical central section, showing the condensing-vessel and the upper portion of the coffee-pot as when made of somewhat greater horizontal area at the top than at the bottom.

A designates the coffee-pot; $a$, the pouring-nozzle; $a'$, the handle of the same, and $a''$ a strainer.

B is the condensing-vessel; $b$, the hood; $b'$, the handle, and $b''$ a pouring-passage thereof.

As shown in the drawings, the upper portion of the coffee-pot and the body of the condensing-vessel are of cylindrical form, the condenser fitting closely, but removably, within the coffee-pot; but it is obvious that both these parts may be made to flare outwardly from the bottom of the condenser upwardly, and, as facilitating the insertion of the condenser, such construction will be found advantageous.

When the condensing-vessel and the corresponding upper portion of the coffee-pot are of cylindrical form, the condenser may be supported by a bead formed on its outer surface and resting on the wall of the coffee-pot, or it may rest by its lower extremity upon a bead which is formed on the inner wall of the coffee-pot, both of these constructions being old and well known.

It will be observed that when the groove or recess $b''$ of the condenser is opposite the spout $a$ the contents of the vessel A may be discharged by tilting the same in the ordinary manner, and that, by reason of the provision of the hood $b$, no portion of the contents of the condenser B will escape therefrom; and, also, that on the return of the apparatus to a vertical position escape of volatile portions of the contents of the vessel A will be instantly arrested by a slight horizontal movement of the condenser to the right or to the left, as shown in Figs. 3 and 5.

In Fig. 4 the hood $b$ of the condenser is made of less vertical extent than that which is represented in Fig. 1, this form being intended for application to vessels of small capacity. Under such construction it will be sufficient to fill the condenser to the extent of one-half only of its capacity, in which case the dimensions of the hood, as shown, will be sufficient to prevent the escape of any portion of the contents of the condenser.

The strainer $a''$ may be of perforated sheet metal, as shown, or of wire-cloth or other suitable material; and, if desired, a similar strainer may be placed, either fixed or removably, at the bottom of the channel $b''$. In practice a spur or lug, c, projecting from the wall of the condenser, may engage between two lugs, c' c', on the vessel A, to limit the horizontal movement of the former. It will be seen that when the recess or pouring-passage b'' is opposite the spout or nozzle a the handle b' of the condenser will be in line between the spout or lip a and the handle a' of the vessel A.

Under the construction thus described the essential purpose of the invention—which is to insure, in a convenient manner and by inexpensive means, the thorough utilization of the valuable properties of the coffee, tea, or other substance which is to be infused—will be effectually accomplished.

Having thus described my invention, what I desire to claim and secure by Letters Patent is—

1. The combination, with a coffee-pot, of a condensing-vessel having a channel through which the contents of the coffee-pot may be discharged.

2. The combination, with a coffee-pot, of a condensing-vessel in which the entire upper surface of the contents of the same is directly exposed to the air, and which is provided with a channel or conduit for the passage of the contents of the coffee-pot.

3. The combination, with a coffee-pot, of a condensing-vessel which is provided with a hood of a capacity adapting it to receive one-half or about one-half of the contents of such condensing-vessel when filled, whereby such contents will be retained whether the condensing-vessel be placed in a vertical or in a horizontal position.

4. In a coffee-pot, a condensing-vessel which has a hood and a pouring-channel.

5. The combination, with a coffee-pot, of a condensing-vessel which, by a slight horizontal movement, is adapted either to permit or to prevent the discharge of the contents of such coffee-pot.

6. The combination of a coffee-pot having a spout or pouring-lip, and a condensing-vessel provided with a conduit for the passage of the contents of the coffee-pot.

JAS. A. ASHLEY.

Witnesses:
   BESSIE ASHLEY,
   ADA ASHLEY.